US012710719B2

(12) United States Patent
Park et al.

(10) Patent No.: US 12,710,719 B2
(45) Date of Patent: Aug. 18, 2026

(54) METAL MATERIAL PRINTING EQUIPMENT AND PRINTING METHOD, AND PRINTED METAL MATERIAL OBTAINED THEREFROM

(71) Applicant: POSCO CO., LTD, Pohang-si (KR)

(72) Inventors: Sun-Hong Park, Pohang-si (KR); Jin-Tae Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/577,649

(22) PCT Filed: Jul. 12, 2022

(86) PCT No.: PCT/KR2022/010080
§ 371 (c)(1),
(2) Date: Jan. 8, 2024

(87) PCT Pub. No.: WO2023/287145
PCT Pub. Date: Jan. 19, 2023

(65) Prior Publication Data
US 2024/0201626 A1 Jun. 20, 2024

(30) Foreign Application Priority Data
Jul. 12, 2021 (KR) ........................ 10-2021-0090915

(51) Int. Cl.
*G03G 15/00* (2006.01)
*G03G 15/043* (2006.01)
(Continued)

(52) U.S. Cl.
CPC ..... *G03G 15/6591* (2013.01); *G03G 15/0435* (2013.01); *G03G 15/0806* (2013.01);
(Continued)

(58) Field of Classification Search
CPC ........... G03G 15/6591; G03G 15/0435; G03G 15/0806; G03G 15/2064; G03G 21/0011;
(Continued)

(56) References Cited

U.S. PATENT DOCUMENTS 5,018,640 A 5/1991 Morofuji et al.
5,189,470 A * 2/1993 Matsuda ............ G03G 15/2064 399/68
(Continued)

FOREIGN PATENT DOCUMENTS

CN 1751883 A 3/2006
CN 207490004 U 6/2018
(Continued)

OTHER PUBLICATIONS

International Search Report dated Oct. 7, 2022, issued in International Patent Application No. PCT/KR2022/010080 (with English translation).
(Continued)

*Primary Examiner* — Sandra Brase
(74) *Attorney, Agent, or Firm* — Morgan Lewis & Bockius LLP

(57) ABSTRACT

The present invention relates to printing equipment for printing images such as letters, pictures and the like on the surface of metal such as a steel plate, that may stably print images on the surface of metal at high speed, a printing method using the same, and a printed metal material obtained therefrom.

13 Claims, 7 Drawing Sheets

(51) Int. Cl.

| | |
|---|---|
| ***G03G 15/08*** | (2006.01) |
| ***G03G 15/20*** | (2006.01) |
| ***G03G 21/00*** | (2006.01) |
| ***G03G 21/12*** | (2006.01) |

(52) U.S. Cl.
CPC ..... *G03G 15/2064* (2013.01); *G03G 21/0011* (2013.01); *G03G 21/0035* (2013.01); *G03G 21/0076* (2013.01); *G03G 21/12* (2013.01)

(58) Field of Classification Search
CPC ........... G03G 21/0035; G03G 21/0076; G03G 21/12; G03G 15/6588
See application file for complete search history.

(56) References Cited

U.S. PATENT DOCUMENTS

| | | | | |
|---|---|---|---|---|
| 5,794,106 | A | 8/1998 | Folkins | |
| 5,893,018 | A * | 4/1999 | De Bock | G03G 15/2064 399/302 |
| 6,741,828 | B2 | 5/2004 | Marsh | |
| 2009/0060602 | A1 * | 3/2009 | Yamaguchi | G03G 15/0806 399/350 |
| 2012/0070206 | A1 | 3/2012 | Tsukioka | |
| 2015/0111142 | A1 | 4/2015 | Tyagi et al. | |
| 2017/0357197 | A1 * | 12/2017 | Okamoto | G03G 15/2064 |
| 2018/0267436 | A1 * | 9/2018 | Tokuyama | G03G 15/1675 |
| 2019/0132958 | A1 | 5/2019 | Sharma et al. | |

FOREIGN PATENT DOCUMENTS

| | | | |
|---|---|---|---|
| EP | 0718719 | B1 | 3/2000 |
| GB | 1312574 | A | 4/1973 |
| JP | H01-163092 | A | 6/1989 |
| JP | H02-259670 | A | 10/1990 |
| JP | H06-35239 | A | 2/1994 |
| JP | H06-40005 | A | 2/1994 |
| JP | H10-151776 | A | 6/1998 |
| JP | 2003-107847 | A | 4/2003 |
| JP | 2007-003880 | * | 1/2007 |
| JP | 2007-003880 | A | 1/2007 |
| JP | 2012-063623 | A | 3/2012 |
| JP | 5264321 | B2 | 8/2013 |
| JP | 2017-111227 | A | 6/2017 |
| KR | 20-0332721 | Y1 | 11/2003 |
| KR | 10-2017-0075932 | A | 7/2017 |
| KR | 10-2018-0117287 | A | 10/2018 |
| WO | 2004/086150 | A1 | 10/2004 |

OTHER PUBLICATIONS

The Extended European Search Report dated Oct. 23, 2024 issued in European Patent Application No. 22842407.3.
Japanese Office Action dated Feb. 18, 2025 issued in Japanese Patent Application No. 2024-500369 (with English translation).
Decision to Grant dated Jun. 10, 2025 issued in corresponding Japanese Patent Application No. 2024-500369 with the English translation. (Note: JP H01-163092 A, JP H06-040005 A, JP H02-259670 A, JP 2017-111227 A, GB 1312574 A, JP 2007-003880 A, JP 5264321 B2, and JP H06-035239 A already submitted.).

* cited by examiner

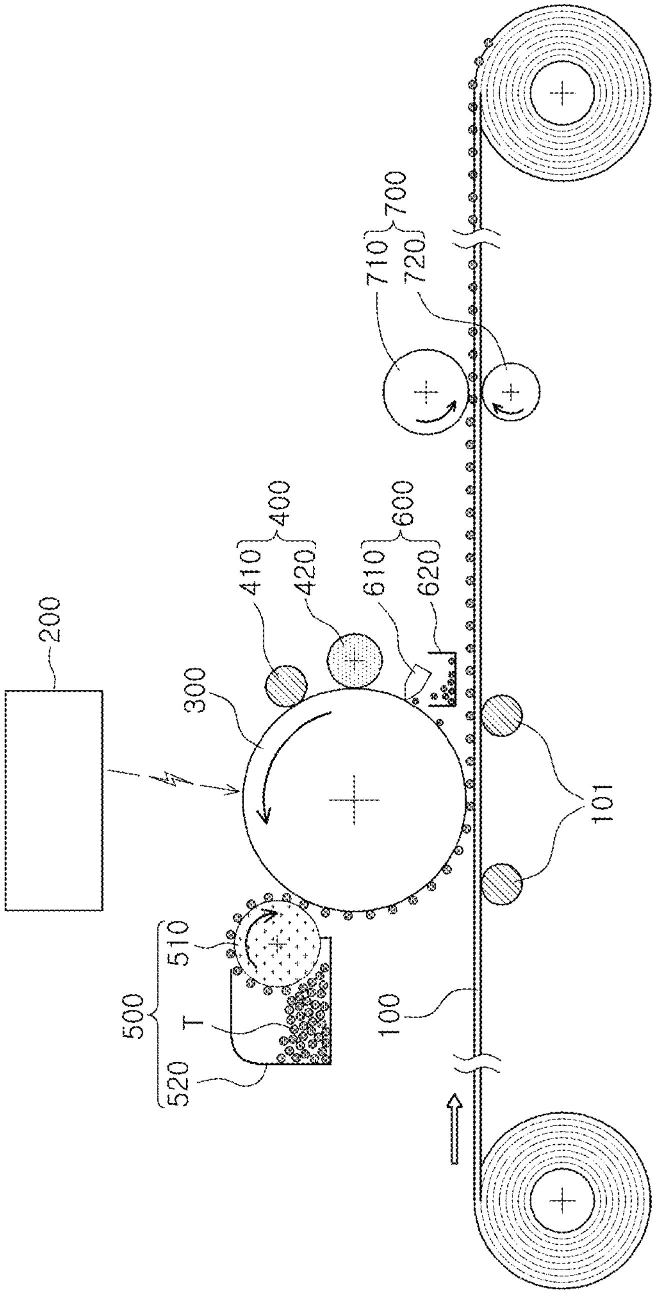
[FIG. 1]

[FIG. 2]
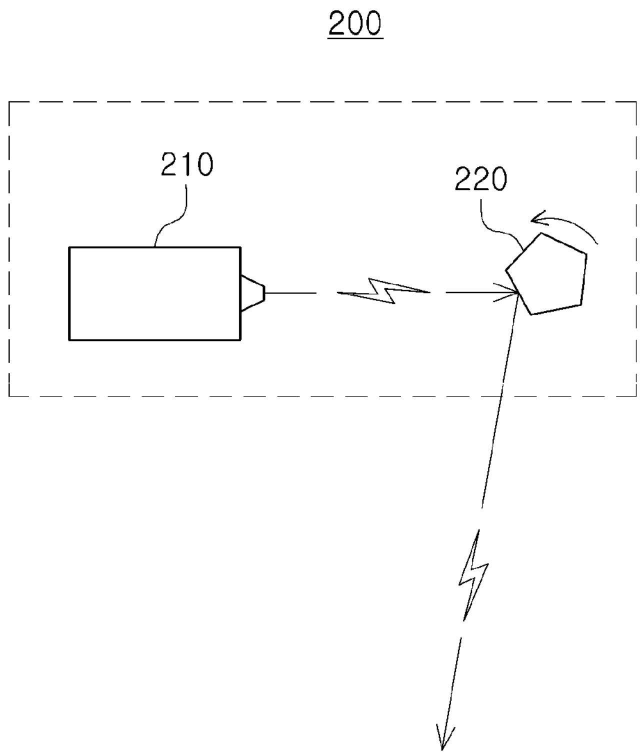

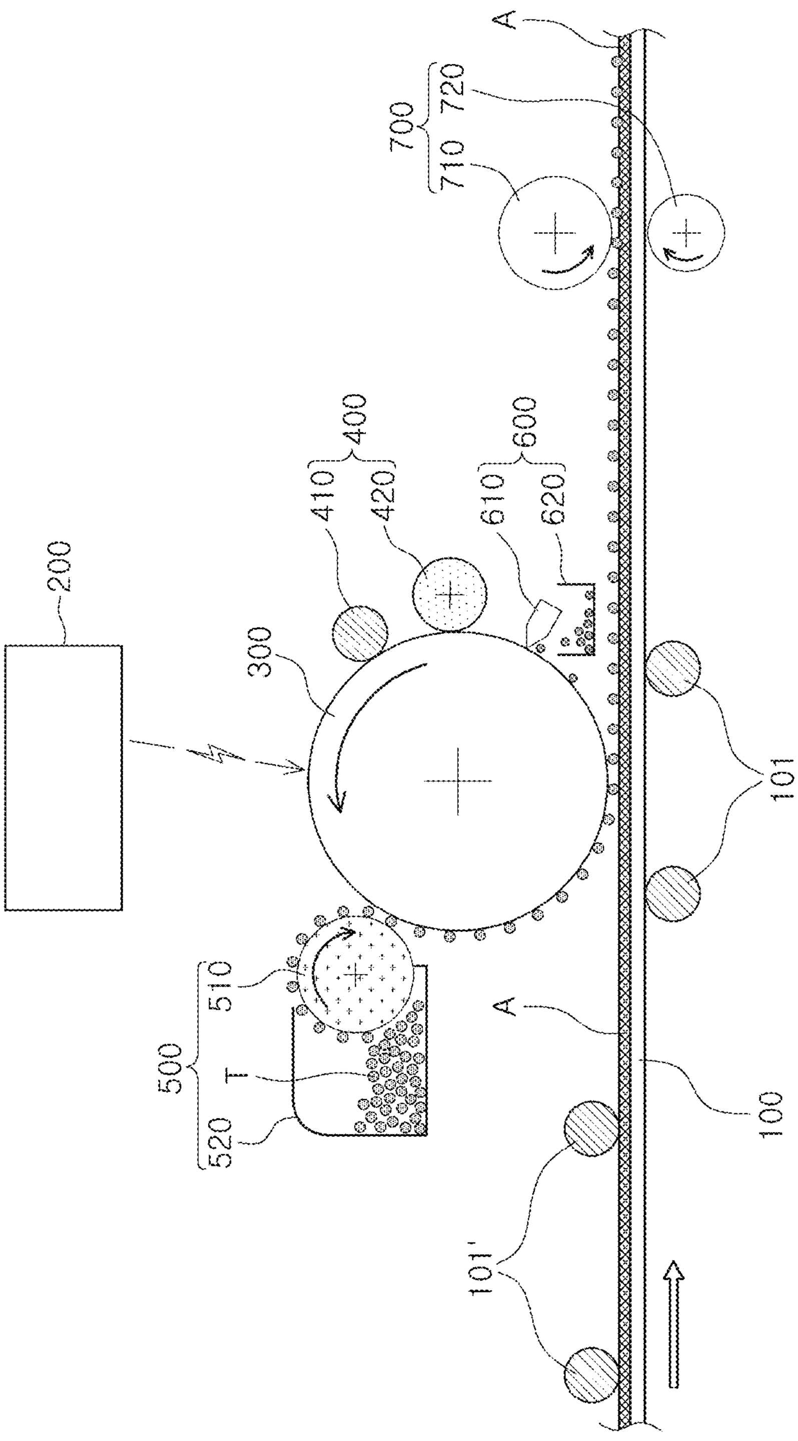
[FIG. 3]

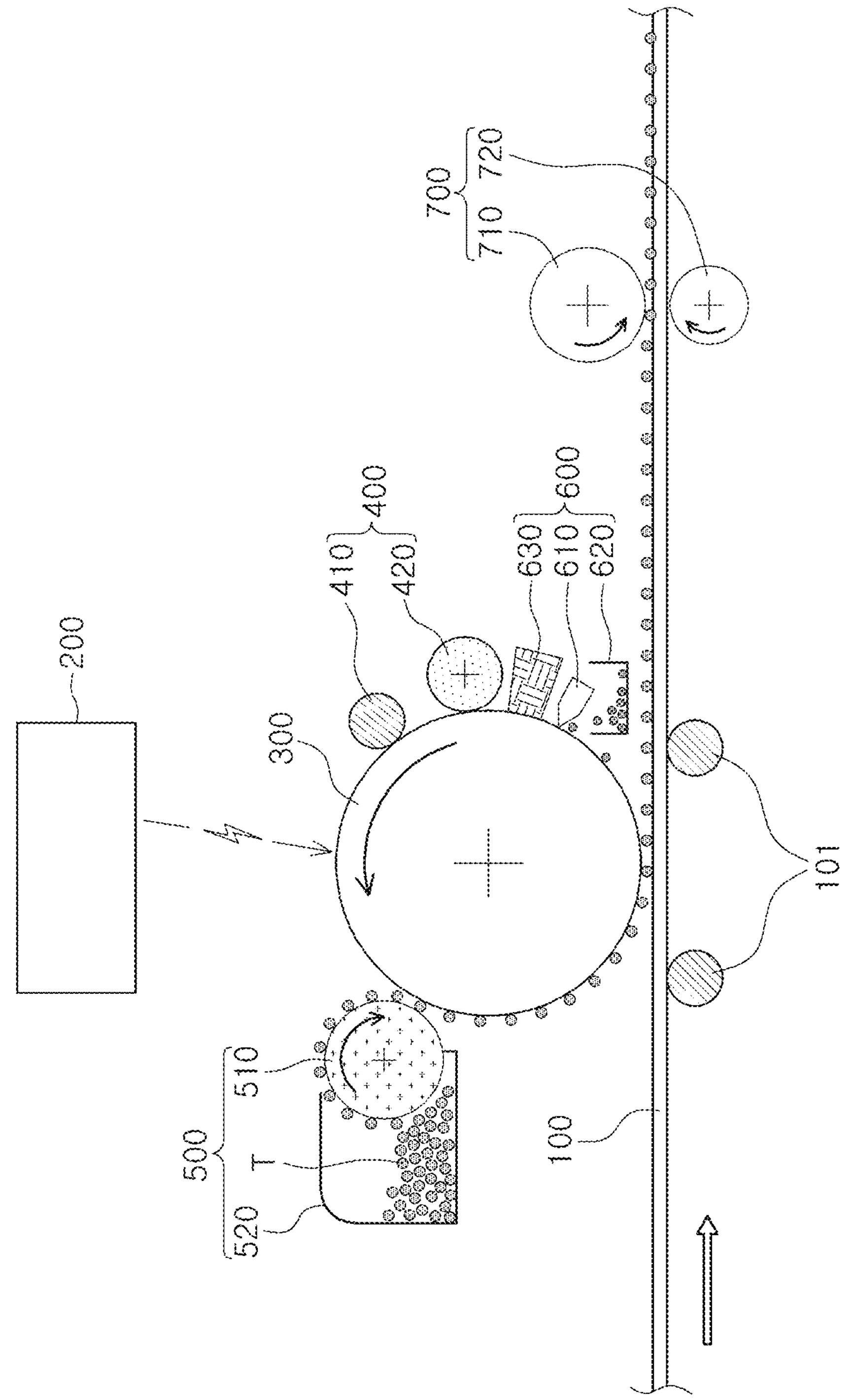
[FIG. 4]

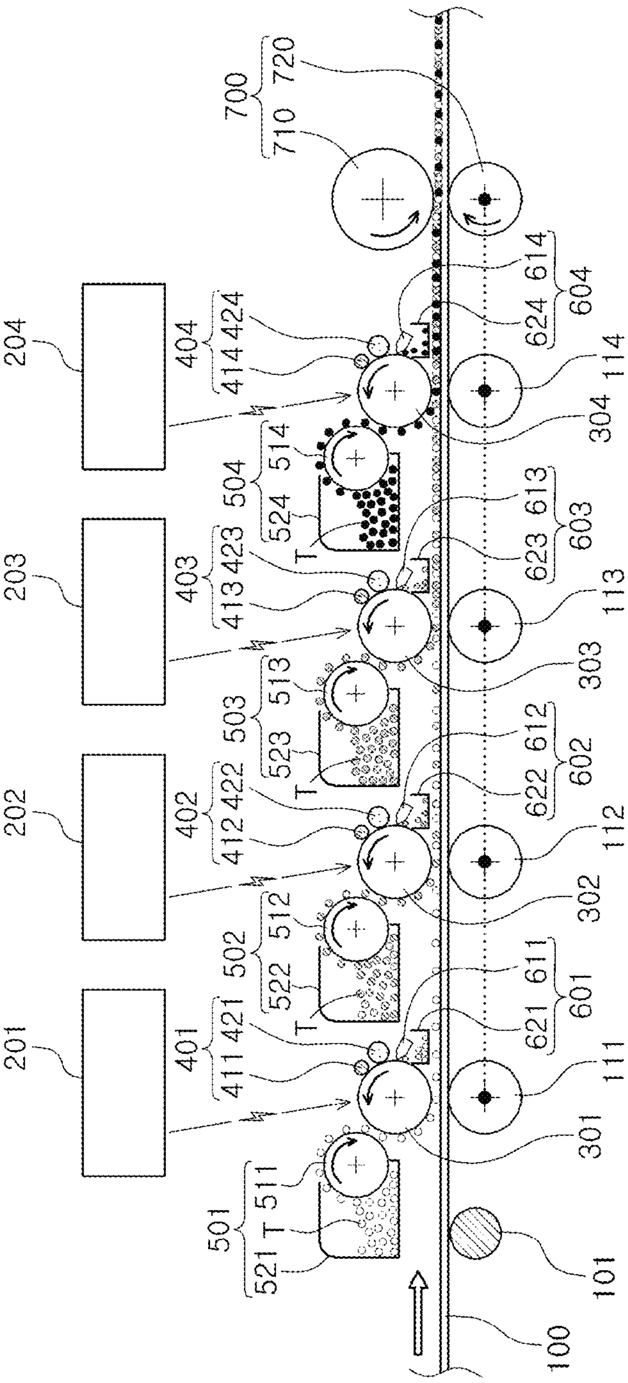
[FIG. 5]

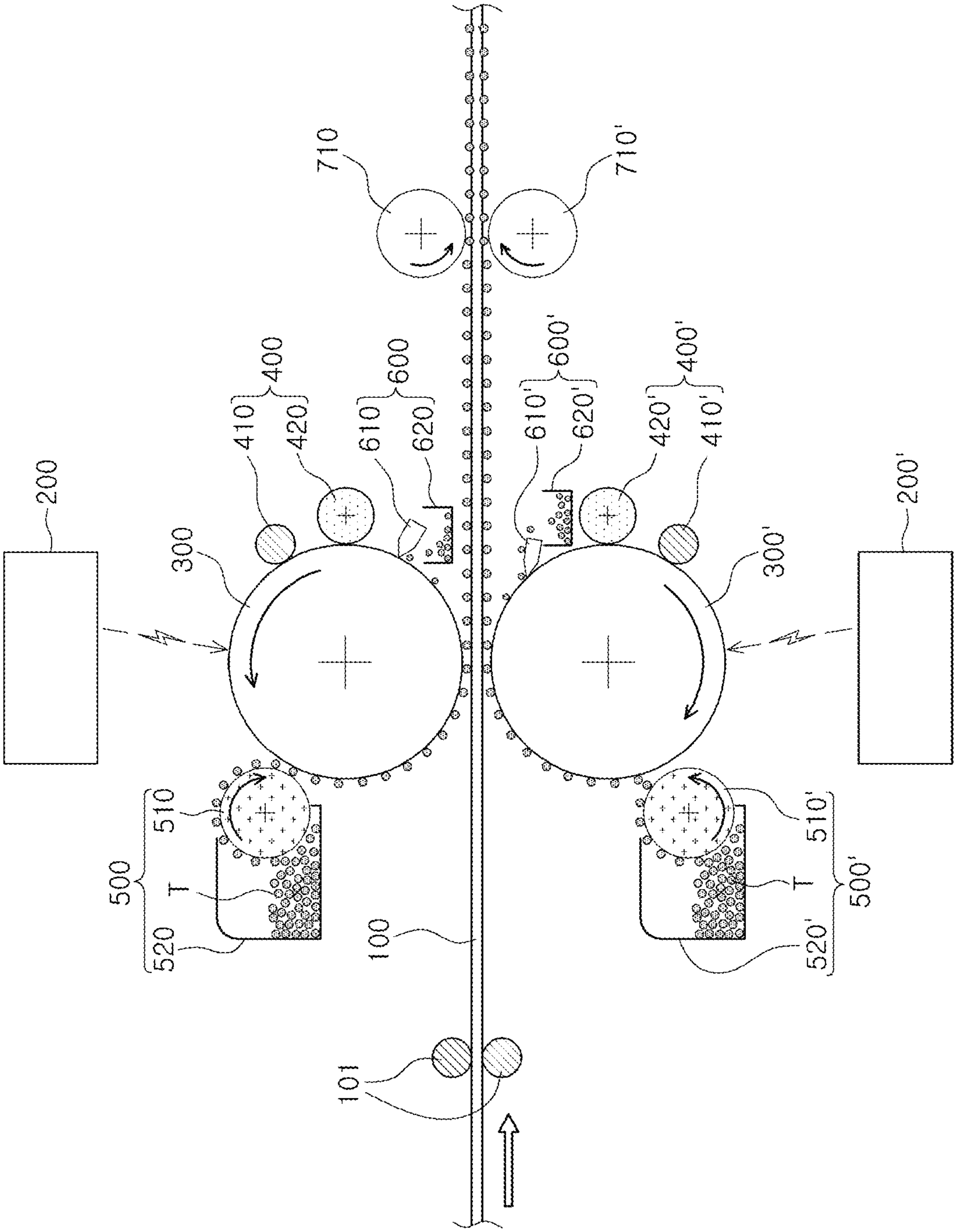
[FIG. 6]

[FIG. 7]
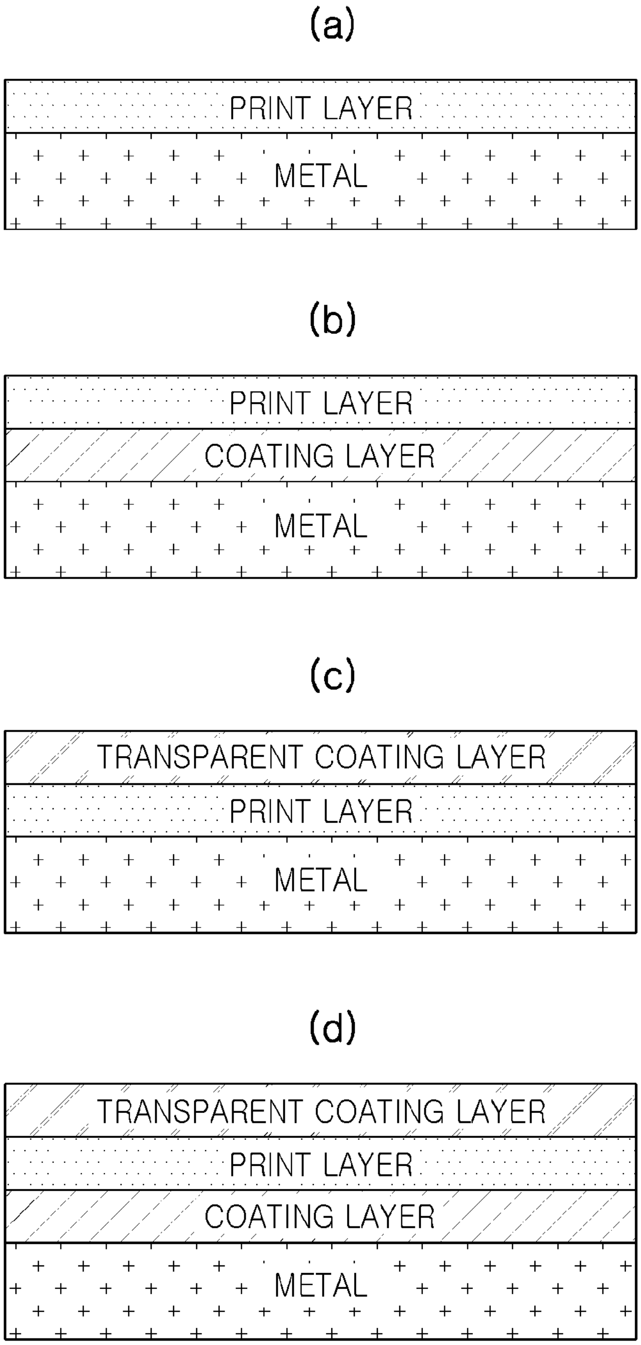

METAL MATERIAL PRINTING EQUIPMENT AND PRINTING METHOD, AND PRINTED METAL MATERIAL OBTAINED THEREFROM

CROSS-REFERENCE OF RELATED APPLICATIONS

This application is the U.S. National Phase under 35 U.S.C. § 371 of International Patent Application No. PCT/KR2022/010080, filed on Jul. 12, 2022, which in turn claims the benefit of Korean Application No. 10-2021-0090915, filed on Jul. 12, 2021, the disclosure of which applications are incorporated by reference herein.

TECHNICAL FIELD

The present disclosure relates to printing equipment for printing images such as letters, pictures and the like on a surface of metal such as a steel plate or the like, a printing method using the same, and a printed metal obtained therefrom.

BACKGROUND ART

As methods for printing images such as letters, pictures and the like on the surface of metals, there are provided a polymer transfer method, a roll transfer method, and an inkjet spray printing method.

The polymer transfer method prints an image film in the form of a sheet and transfers the image to the surface of a metal using a method such as thermal transfer, chemical transfer, or the like. The method of transferring images on a metal surface using film is free to print on film, but there is a disadvantage in that the manufacturing speed is slow by transferring the film to a steel plate and there is a disadvantage in that images attached to a metal surface in the form of a film may be deformed depending on temperature or weather.

The roll transfer method is a method of forming a certain pattern on the surface of a roll and transferring the image to the surface of metal using a roll to roll method. However, the transferred images are limited to repetitive images, and to use the roll transfer method, since rolls patterned with respective images should be prepared, there is a difficulty in preparing patterned rolls each time for various images.

The inkjet spray printing method is a method of printing images or letters on the surface of metal using liquid ink containing pigment and polymer resin. In the inkjet spray printing method using liquid ink, there is a problem in which the surface of the metal should be plasma treated or the surface roughness should be controlled so that the liquid may be well adsorbed on the surface of the steel plate. In addition, since the inkjet spray printing method uses liquid ink, a clogging phenomenon occurs in a nozzle through which ink is sprayed, and thus not only nozzle management but also periodic cleaning and replacement of the nozzle are required. In addition, since liquid ink is used, stabilization after ink injection is essential, and it is difficult to manufacture using the roll-to-roll method, and thus the use is limited to a batch type. In detail, since an inkjet spray print material has a form of linked liquid polymer and has pigments forming images therein, there is a problem in which the printed image may peel off when bending or cutting the metal surface.

Recently, metal has been used in various fields, and cases in which images such as letters, pictures and the like are applied to metal surfaces have been increasing. However, the existing image printing method is a method of printing on the surface of paper, a polymer material, or the like and has technical and production limitations in application to the surface of metal. Therefore, there is a need for a method to solve the limitations of the printing method of the related art.

Summary of Invention

Technical Problem

An aspect of the present disclosure is a technology for printing images such as letters, pictures and the like on the surface of metal and is to provide printing equipment that may stably print images on the surface of metal at high speed, a printing method using the same, and a printed metal obtained therefrom.

The object of the present disclosure is not limited to the above-mentioned matters. Additional problems of the present disclosure are described throughout the specification, and a person skilled in the art to which the present disclosure pertains will have no difficulty in understanding the additional problems of the present disclosure from the contents described in the specification of the present disclosure.

Solution to Problem

According to an aspect of the present disclosure, metal printing equipment includes a photosensitive drum 300 coming into close contact with metal 100 moving continuously, rotating in one direction, and transferring and fixing a toner T attached to a surface thereof to a surface of the metal 100; a developing unit 500 provided on one side of the photosensitive drum 300 and providing the toner (T) to the surface of the photosensitive drum 300; a photosensitive drum charging unit 410 charging the surface of the photosensitive drum 300 before the toner (T) is provided; an exposure unit 200 applying light energy to the surface of the photosensitive drum 300 according to a required image, between the developing unit 500 and the photosensitive drum charging unit 410; metal charging unit 101 charging the surface of the metal 100 such that the toner (T) attached to the surface of the photosensitive drum 300 is transferred to the surface of the metal 100; a removal unit 600 removing the toner (T) remaining on the surface of the photosensitive drum 300 after the toner (T) is fixed to the surface of the metal 100; a photosensitive drum discharging unit 420 removing a charge from the photosensitive drum 300 after removing the toner (T); and a fixing unit 700 located on a rear end of the photosensitive drum 300 and fixing the toner (T) fixed to the surface of the metal 100.

According to another aspect of the present disclosure, a metal printing method includes a charging operation of charging a surface of a photosensitive drum 300 rotating in one direction; an exposure operation of applying light energy according to a required image to the surface of the charged photosensitive drum 300; a development operation of providing toner (T) to the surface of the photosensitive drum 300 after the exposure operation; a transfer operation of continuously moving the toner attached to the surface of the photosensitive drum 300 and moving and fixing the toner to a surface of a charged metal 100; a fixing operation of fixing the toner fixed to the surface of the metal 100; a removal operation of removing toner remaining on the surface of the photosensitive drum 300 after the transfer operation; and a discharging operation of discharging the surface of the photosensitive drum 300.

According to another aspect of the present disclosure, a printed metal includes metal; and a print layer formed on the metal.

Advantageous Effects of Invention

The present disclosure provides a technology for stably printing images such as letters, pictures and the like on materials such as metal and the like, and by manufacturing this continuously, the production efficiency of the product may be improved. In addition, there is an advantage in that high value-added products may be manufactured by easily forming diverse and colorful images.

The various and beneficial advantages and effects of the present disclosure are not limited to the above-described content, and may be more easily understood through description of detailed embodiments of the present disclosure.

BRIEF DESCRIPTION OF DRAWINGS

FIG. 1 is a schematic diagram schematically illustrating an embodiment of printing equipment in the present disclosure.

FIG. 2 is a schematic diagram illustrating an example of a laser exposure unit in the printing equipment of the present disclosure in detail.

FIG. 3 is a schematic diagram schematically illustrating another embodiment of the printing equipment in the present disclosure.

FIG. 4 is a schematic diagram schematically illustrating another embodiment of the printing equipment in the present disclosure.

FIG. 5 is a schematic diagram schematically illustrating another embodiment of the printing equipment in the present disclosure.

FIG. 6 is a schematic diagram schematically illustrating another embodiment of the printing equipment in the present disclosure.

FIG. 7 is a schematic diagram schematically illustrating a cross section of a printed metal in the present disclosure.

BEST MODE FOR INVENTION

The terms used in this specification are for describing the present disclosure and are not intended to limit the present disclosure. Additionally, as used herein, singular forms include plural forms unless the relevant definition clearly indicates the contrary.

The meaning of “including” used in the specification specifies a configuration and does not exclude the presence or addition of another configuration.

Unless otherwise defined, all terms, including technical and scientific terms, used in this specification have the same meaning as that, which would be commonly understood by a person of ordinary skill in the technical field to which the present disclosure pertains. Terms defined in the dictionary are interpreted to have meanings consistent with related technical literature and currently disclosed content.

Generally known laser or LED printing is for printing on flexible objects such as paper and the like, but the present disclosure relates to technology for printing images on metals. To print on the surface of metal moving continuously using a roll-to-roll method, the present disclosure relates to printing equipment in which respective components, such as a charging unit, a photosensitive drum, a fused roll and the like are implemented in one direction according to the direction of movement of the metal, and a printing method using the same.

In detail, according to the present disclosure, compared to the existing printing method on metals, not only diverse and complex images, but also images of various colors may be easily and economically implemented.

Hereinafter, preferred embodiments of the present disclosure will be described with reference to the drawings. Embodiments of the present disclosure may be modified in various forms, and it should not be construed as being limited to the drawings and the implementation examples described below, but the embodiments are provided for detailed explanation to those skilled in the art of the present disclosure.

FIG. 1 schematically illustrates an embodiment of the printer equipment of the present disclosure. The printing equipment of the present disclosure is printing equipment for printing an image on the surface of a continuously moving metal 100. As an example, as illustrated in FIG. 1 and the like, there is an advantage in that continuous mass production may be performed by printing an image on the surface of the metal 100 that continuously moves in a roll-to-roll manner. On the other hand, the image refers to letters, patterns, pictures, and the like, and may be in various forms such as solid color, achromatic color, chromatic color, three-dimensional shape, and the like.

The printing equipment of the present disclosure includes a photosensitive drum 300, a photosensitive drum charging unit 410, a photosensitive drum discharging unit 420, an exposure unit 200, a developing unit 500, metal charging unit 101, and a removal unit 600, a fixing unit 700, and the like. Below, respective configurations are described in detail.

The photosensitive drum 300 is in close contact with the surface of the metal 100 and rotates in one direction, transferring a toner T attached to the surface to the surface of the metal 100 and fixing the same to transfer the image. In FIG. 1 and the like of the present disclosure, the photosensitive drum 300 is illustrated as rotating in one direction, but does not necessarily rotate in only one direction, and may also rotate in both directions. The photosensitive drum 300 is sufficient as long as it is commonly used in the technical field to which the present disclosure pertains, and the type thereof is not particularly limited. A preferred example is to use an Organic Photo Conductor (OPC) drum.

The developing unit 500 is provided on one side of the photosensitive drum 300 and provides toner T for forming an image on the surface. The developing unit 500 is sufficient as long as it may provide toner to the photosensitive drum 300, and the form or shape thereof is not particularly limited. In FIG. 1, as a preferred example, the developing unit 500 includes a toner container 520 containing toner T and a developing roller 510 transferring the toner from the toner container 520 to the photosensitive drum 300.

The developing roller 510 is not essential, and in some cases, it may be provided directly from the toner container 520 to the photosensitive drum 300. On the other hand, the toner (T) forms an image on the surface of metal, and anything known to those skilled in the art in the technical field to which the present disclosure pertains may be used, and there is no particular limitation on the type thereof. For example, a material having a polymer structure may be used. Additionally, in the present disclosure, substances (for example, fluorescent substances, magnetic substances, electrically conductive substances, and the like) that may provide various functions to the toner may be added, and not only may an image with a function be implemented, but various toner particles may be used to provide illumination or implement a three-dimensional shape.

The photosensitive drum charging unit 410 charging the surface of the photosensitive drum 300 before the toner T is provided is included. The photosensitive drum charging unit 410 applies electrostatic charge to the surface of the photosensitive drum. As the charging unit, corona wire is usually used.

Between the developing unit 500 and the photosensitive drum charging unit 410, the exposure unit 200 is provided for applying light energy according to a required image to the charged surface of the photosensitive drum 300. The position of the exposure unit 200 is not important, but the light energy is imparted to the surface of the photosensitive drum 300 between the developing unit 500 and the photosensitive drum charging unit 410. Due to the light energy, some charges are removed from the surface of the photosensitive drum 300, and the toner is attached to the surface of the photosensitive drum 300 by the developing unit 500. The light energy is preferably a laser or Light Emitting Diode (LED). FIG. 2 schematically illustrates the exposure unit 200 when using the laser, and a laser generator 210, and a scanning mirror 220 that adjusts the laser coming from the laser generator 210 and scans the surface of the photosensitive drum 300 according to a required image to remove charges are included.

The metal charging unit 101 charging the surface of the metal 100 is included such that the toner (T) attached to the photosensitive drum 300 may be moved to the continuously moving metal 100 and fixed thereon. The metal charging unit 101 not only serves to charge the metal with a certain electric charge, but also may serve as a guide roll to help the metal move at a constant speed. The metal charging unit 101 may be provided in one or more, and the metal charging unit 101 may be formed at the front, rear, or front and rear ends of the photosensitive drum 300 based on the moving direction of the metal 100, and may be located above, below, or both above and below the metal 100. Even if there are two or more metal charging unit 101, they do not play different roles, but there is an advantage in that a stronger electrostatic attraction may be secured through two or more charging.

On the other hand, FIG. 3 illustrates another embodiment of the present disclosure. As illustrated in FIG. 3, a separate coating layer (A), such as a resin layer or the like, is formed on the surface of the metal 100, and when printing on the coating layer, a metal charging unit 101' for charging the coating layer (A) may be positioned on the coating layer (A).

The removal unit 600 removing the toner (T) remaining on the surface of the photosensitive drum 300 after the toner (T) is fixed to the surface of the metal 100 is included. The removal unit 600 includes a blade 610 for separating residual toner on the surface of the photosensitive drum 300, and a collection bin 620 on a lower end of the blade 610 to collect the separated toner to prevent the separated toner from falling onto the metal 100 and deteriorating printing quality.

The fixing unit 700 for stably forming an image by fixing the toner (T) on the metal 100 after the toner (T) is fixed to the metal may be provided on the rear end of the photosensitive drum 300 based on the moving direction of the metal 100. The fixing unit 700 includes a fused roll 710 applying heat to the toner (T) and fixing the toner (T) fixed to the metal 100, and a pressure roll 720 helping fixing by applying pressure. At this time, a heating temperature of the fused roll 710 is preferably 25 to 400° C.

In the present disclosure, it is more preferable that the metal charging unit 101 and the pressure roll 720 have a structure capable of moving up and down. The metal 100 cannot always have a constant thickness, and may be a significantly thin film or a thick plate. Therefore, if the metal charging unit 101 and the pressure roll 720 may be moved up and down in a variable structure depending on the thickness of the metal 100, images may be printed regardless of the thickness of the metal 100.

FIG. 4 schematically illustrates another embodiment of the printer equipment of the present disclosure, and the printing equipment illustrated in FIG. 4 illustrates, in more detail, the removal unit 600 removing the toner remaining on the surface of the photosensitive drum 300 after the toner T of the photosensitive drum 300 moves and settles on the surface of the metal 100. In addition to the blade 610 and the collection bin 620 described above, an additional alcohol brush 630 may further be included. The photosensitive drum 300 rotates at high speed and transfers the image, and thus there is a case in which it is not easy to remove the toner. In this case, there is a problem in which an afterimage of the image may remain. To this end, after primary removal is performed with the blade 610, secondary removal may be performed by a chemical method using the alcohol brush 630 or the like.

On the other hand, one toner or more may be used to print various images, and in this case, two or more photosensitive drums, photosensitive drum charging units, photosensitive drum discharging units, exposure units, developing units, and removal units may be provided in pairs according to the direction of movement of the metal. FIG. 5 schematically illustrates another embodiment of the printer equipment of the present disclosure. FIG. 5 illustrates printing equipment for transferring an image by providing four types of toner to print a color image, and the four types of toner may be C (Cyan), Y (Yellow), M (Magenta), and K (Black), respectively. The four types of toner do not necessarily have to be used, and may include W (White). It is possible to use some or more of these in duplicate, and the order thereof is also not particularly limited. A person skilled in the art may arbitrarily select by considering the required image, work efficiency, and the like. However, the white (W) toner may be located at the front in the direction of movement of the metal.

FIG. 5 illustrates printing equipment when using four types of toner. Accordingly, in FIG. 5, to fix four types of toner on the metal 100, four pairs of photosensitive drums 301, 302, 303 and 304, photosensitive drum charging and discharging units 401, 402, 403 and 404, exposure units 201, 202, 203 and 204, developing units 501, 502, 503 and 504, and removal units 601, 602, 603 and 604 are provided respectively. However, the fixing unit 700 for fixing the toner fixed to the metal 100 is for finally fixing the image, and does not necessarily need to be multiple.

On the other hand, as illustrated in FIG. 5, when multiple photosensitive drums are used, since there is a risk that the metal 100 may sag due to the characteristics of the roll-to-roll method, support rolls 111, 112, 113, and 114 may be further provided to support the metal and to promote continuous movement thereof. It is preferable that the support rolls 111, 112, 113, and 114 also have a variable structure that may move up and down depending on the thickness of the metal 100.

FIG. 6 illustrates another embodiment of the present disclosure. FIG. 6 relates to a facility in which the above-described print facility may sequentially or simultaneously print both sides of a continuously moving metal 100, and schematically illustrates that the above-described type of printing equipment is located on upper and lower portions of the metal. In detail, there is provided a technology for printing both the front and back sides of metal by providing respective components with the above-mentioned functions and roles on the upper and lower portions of the metal.

Hereinafter, the printing method of metal in the present disclosure will be described in detail. The printing method will be described with reference to the above-described drawings below.

The present disclosure provides a method of printing an image on the surface of a continuously moving metal 100, and first, the surface of a photosensitive drum 300 rotating in one direction is charged. The photosensitive drum 300 is charged with a certain charge to form a charge layer, and then it is prepared to apply the image using toner (T). The surface of the photosensitive drum 300 may have either a positive (+) charge or a negative (−) charge.

Exposure is performed to apply light energy to the surface of the photosensitive drum 300 charged by forming the charge layer. The exposure removes charges from the surface of the photosensitive drum 300 using light energy, thereby allowing toner to move to the surface of the photosensitive drum 300 according to a required image. The light energy may be in various forms, and it is preferable to use a laser or an LED light source.

Toner is attached to the exposed surface of the photosensitive drum 300, and this is called a development operation. The toner is charged with a charge opposite to a charge of the photosensitive drum 300 and is adhered to the surface of the photosensitive drum 300. In the development operation, referring to the example of FIG. 1, the developing roller 510 transfers a certain amount of toner (T) from the toner container 520 to the photosensitive drum 300. However, the developing roller 510 is not necessarily necessary, but it may also be moved directly from the toner container 520 to the photosensitive drum 300. For example, the development operation is a process in which toner is attached according to the required image on the surface of the photosensitive drum 300.

Thereafter, the toner attached to the surface of the photosensitive drum 300 moves to the continuously moving charged metal 100, and a transfer operation of fixing the toner on the surface of the metal 100 is performed. The metal 100 is charged with the same charge as the photosensitive drum 300, and is charged with a charge opposite to that of the toner such that the toner of the photosensitive drum moves to the metal 100. The transfer operation is a process in which an image is printed on the surface of the metal 100 and is the process in which the metal 100 is charged with a charge opposite to that of the toner and thus pulls the toner and fixes the toner on the surface of the metal 100. Charging of the metal 100 may be performed before, after, or both before and after the transfer operation. On the other hand, as illustrated in FIG. 3, when a separate coating layer (A) is formed on the surface of the metal 100, and when printing on the coating layer (A), metal charging unit 101' that may allow the coating layer (A) to be charged may be additionally provided.

The toner fixed to the surface of the metal 100 is subjected to a fixing operation, and the fixing operation may be performed by a thermocompression method, and in detail, heat is applied and compressed at the same time by the fused roll 710 and the pressure roll 720. At this time, the heating temperature is preferably 25 to 400° C. The toner used in the present disclosure is used for printing metals, as described above, and has a main ingredient of a polymer structure. In detail, since metals have a high heat transfer rate, it is difficult to melt and adsorb toner. Thus it should be heated to an appropriate temperature such that the toner may be adsorbed. To this end, since it may be fixed to the surface of metal by reacting at a temperature of room temperature or more, the heating temperature is preferably 25° C. or higher. On the other hand, if the temperature exceeds 400° C., there may occur a problem in which the polymer structure of the toner decomposes, and thus the heating preferably does not exceed 400° C. More preferably, it is heated to 50 to 300° C.

Separately from the metal 100, a removal operation is performed to remove the toner remaining on the surface of the photosensitive drum 300 after transfer. This may cause an afterimage to remain in the subsequent printing process due to the remaining toner, thereby deteriorating printing quality. At this time, in the removal method, physical removal is performed by the blade 610, as illustrated in FIGS. 1 and 4, and the toner removed in this manner may be collected into the collection bin 620, to be prevented from falling onto metals. On the other hand, for more complete removal, chemical removal may be further performed using the alcohol brush 630 after the physical removal.

Thereafter, to extinguish the charge remaining on the photosensitive drum 300, an operation of discharging the surface of the photosensitive drum 300 is performed. Through the discharge, the photosensitive drum 300 may be prepared for new printing.

In the printing method of the present disclosure, color images may be printed using toner (T) of two or more colors, for example, various colors such as W (White), C (Cyan), Y (Yellow), M (Magenta), K (Black), and the like. At this time, the printing may be performed using two or more toners, and in this case, as described above, two or more photosensitive drums, photosensitive drum charging units, photosensitive drum discharging units, exposure units, developing units, and removal units are provided in pairs. By performing the charging operation, the exposure operation, development operation, transfer operation, and removal operation two times or more, thereby implementing various colors. The order of the colors is not particularly limited in the present disclosure and may be determined considering the required image, work efficiency, or the like.

An example thereof is illustrated in FIG. 5. In FIG. 5, four pairs of photosensitive drums, photosensitive drum charging units, photosensitive drum discharging units, exposure units, developing units, and removal units are provided, and printing is performed by performing respective operations. On the other hand, when white toner is used at the forefront based on the direction of movement of the metal, since the white background image may be transferred first, it has an advantage of increasing clarity of an overall image.

On the other hand, as illustrated in FIG. 6, to print on both the top and back sides of the metal, the above-described printing method of the present disclosure may be applied sequentially or simultaneously to the upper and lower surfaces to print an image on both surfaces of metal.

Next, a printed metal obtained using the above printing equipment or printing method will be described in detail. FIG. 7 schematically illustrates the printed metal of the present disclosure, and the present disclosure will be described in detail with reference to FIG. 7.

The printed metal of the present disclosure includes a print layer formed on the metal, as illustrated in FIG. 7A. As described above, the types of metals are not limited, such as steel plates, non-ferrous metals, metal alloys and the like.

The print layer is preferably formed using the above-described metal printing equipment or the above-described metal printing method. For example, the print layer is preferably formed using printing equipment and printing method that uses a laser, LED, or the like as an exposure unit.

The print layer may form more diverse images compared to images formed on existing metals. The print layer has the advantage of not only having a clear shape and color compared to images formed by existing printing methods, but also having excellent processing characteristics due to high resistance to peeling. Existing printing methods were performed by roll coating and inkjet coating using liquid pigments or dyes. This liquid type method uses transparent polymer resin (approximately 70-80 wt. %) mixed with colored particles (approximately 20-30 wt. %). For example, since most of the pigments and dyes are transparent polymer resins, the shape or color is not clearly visible, and if the liquid particles are large, the possibility of peeling due to the stress applied to the entire polymer increases, and thus the processing characteristics are low. In contrast, the print layer of the present disclosure uses toner, which is a solid powder, and each particle of the powder corresponds to a unit particle containing color, thereby forming excellent color. Additionally, existing printing methods use liquid pigments or dyes and are thus greatly affected by the surface state of the material being printed. For example, since printing quality is affected by the surface roughness or surface shape of the material, effort is required for pretreatment of the surface, such as roughness management or the like. However, the printing method using a laser, an LED, or the like according to the present disclosure is a method in which toner powder is printed by an electrical adsorption and compression process, and thus it may be formed more easily than the existing method.

On the other hand, the printed metal of the present disclosure may further include a coating layer between the metal and the print layer, as illustrated in FIG. 7B. The coating layer may include a wet or dry plating layer, such as an electrogalvanized (EG) layer, a hot-dip galvanized (GI) layer, or the like.

In addition, the coating layer may include a pretreatment layer formed on the plating layer, a middle coat layer formed on the pretreatment layer, and a top coat layer formed on the middle coat layer.

The pretreatment layer, the middle coat layer, and the top coat layer are not particularly limited in the present disclosure, and may include all those known in the technical field to which the present disclosure pertains. Below, a preferred example will be described.

The pretreatment layer is intended to improve the adhesion between a base metal and the middle coat layer (primer layer), and is usually formed within 1 μm, and chromium-free (Cr-free) polymer coating, chromium hexavalent ($Cr^{6+}$), or chromium trivalent ($Cr^{3+}$) coating may be performed.

The middle coat layer (primer layer) is used to ensure corrosion resistance and conceal the base layer, and is made to about 5 μm, and may be coated using polyester, urethane, epoxy, or the like. However, the middle coat layer may be omitted depending on the purpose.

The top coat layer (top coating layer) represents surface properties, is directly related to the physical properties of the product, and is formed on a top coat layer of the print layer. Accordingly, the top coat layer is intended for protection, color, and concealment in the event of physical damage to the surface, and to this end, may be about 15 to 20 μm thick, and may use polyester, urethane, epoxy, or the like.

On the other hand, the printed metal of the present disclosure may further include a transparent coating layer on the print layer, as illustrated in FIGS. 7C and 7D. The transparent coating layer requires gloss or serves to protect the print layer. The transparent coating layer is also not particularly limited in the present disclosure, and may include all those known in the technical field to which the present disclosure pertains.

For example, as the transparent coating layer, polymer-types may be used, and similar to the top coat layer, polymer resins such as polyester, urethane and the like may be used, and for outdoor use, fluororesin is also used. The transparent coating layer may be formed to have a thickness of about 1 to 5 μm depending on the use.

DESCRIPTION OF REFERENCE CHARACTERS

100 . . . METAL
101, 101' . . . METAL CHARGING UNIT
111, 112, 113, 114 . . . SUPPORT ROLL
200, 200',201, 202, 203, 204 . . . EXPOSURE UNIT
210 . . . LASER GENERATOR
220 . . . SCANNING MIRROR
300, 300',301, 302, 303, 304 . . . PHOTOSENSITIVE DRUM
400, 400',401, 402, 403, 404 . . . PHOTOSENSITIVE DRUM CHARGING AND DISCHARGING UNIT
410, 410',411, 412, 413, 414 . . . PHOTOSENSITIVE DRUM CHARGING UNIT
420, 420',421, 422, 423, 424 . . . PHOTOSENSITIVE DRUM DISCHARGING UNIT
500, 500',501, 502, 503, 504 . . . DEVELOPING UNIT
510, 510',511, 512, 513, 514 . . . DEVELOPING ROLLER
520, 520',521, 522, 523, 524 . . . TONER CONTAINER
600, 600',601, 602, 603, 604 . . . REMOVAL UNIT
610, 610',611, 612, 613, 614 . . . BLADE
620, 620',621, 622, 623, 624 . . . COLLECTION BIN
630 . . . ALCOHOL BRUSH
700, 700' . . . FIXING UNIT
710, 710' . . . FUSED ROLL
720 . . . PRESSURE ROLL

The invention claimed is:

1. Metal printing equipment comprising:

a photosensitive drum (300) coming in close contact with metal (100) moving continuously, rotating in one direction, and transferring and fixing a toner T attached to a surface thereof to a surface of the metal (100);

a developing unit (500) provided on one side of the photosensitive drum (300) and providing the toner (T) to the surface of the photosensitive drum (300);

a photosensitive drum charging unit (410) charging the surface of the photosensitive drum (300) before the toner (T) is provided;

an exposure unit (200) applying light energy to the surface of the photosensitive drum (300) according to a required image, between the developing unit (500) and the photosensitive drum charging unit (410);

metal charging unit (101) charging the surface of the metal (100) such that the toner (T) attached to the surface of the photosensitive drum (300) is transferred to the surface of the metal (100);

a removal unit (600) removing the toner (T) remaining on the surface of the photosensitive drum (300) after the toner (T) is fixed to the surface of the metal (100);

a photosensitive drum discharging unit (420) removing a charge from the photosensitive drum (300) after removing the toner (T); and a fixing unit (700) located on a rear end of the photosensitive drum (300) and fixing the toner (T) fixed to the surface of the metal (100), wherein the fixing unit (700) includes a pressure roll (720), wherein the pressure roll (720) has a structure capable of moving up and down depending on the thickness of the metal (100) in a fixing operation, wherein the metal charging unit (101) is included as two or more, and two or more metal charging units (101) are provided both in front and rear ends of the photosensitive drum (300) based on a moving direction of the metal (100) or both above and below the metal (100), and the two or more metal charging units (101) are configured to charge the metal (100) to the same polarity.

2. The metal printing equipment of claim 1, wherein the removal unit (600) includes a blade (610) and a collection bin (620) located on a lower end of the blade (610).

3. The metal printing equipment of claim 2, wherein the removal unit (600) further includes an alcohol brush (630) between the blade (610) and the collection bin (620).

4. The metal printing equipment of claim 1, wherein the light energy is a laser or an LED.

5. The metal printing equipment of claim 4, wherein when the light energy is a laser, the exposure unit (200) includes a laser generator (210) and a scanning mirror (220).

6. The metal printing equipment of claim 1, wherein the developing unit (500) includes a toner container (520) and a developing roller (510) providing the toner (T) of the toner container (520) to the photosensitive drum (300).

7. The metal printing equipment of claim 1, wherein the fixing unit (700) includes a fused roll (710).

8. The metal printing equipment of claim 1, wherein two or more of the photosensitive drums, the photosensitive drum charging units, the photosensitive drum discharging units, the exposure units, the developing units, and the removal units are provided in pairs in the moving direction of the metal (100), wherein the respective developing units provide toner of different colors.

9. The metal printing equipment of claim 1, wherein the metal printing equipment is located above and below the metal.

10. A metal printing method comprising:

a charging operation of charging a surface of a photosensitive drum (300) rotating in one direction;

an exposure operation of applying light energy according to a required image to the surface of the charged photosensitive drum (300);

a development operation of providing toner (T) to the surface of the photosensitive drum (300) after the exposure operation;

a transfer operation of continuously moving the toner attached to the surface of the photosensitive drum (300) and moving and fixing the toner to a surface of a charged metal (100);

a fixing operation of fixing the toner settled on the surface of the metal (100);

a removal operation of removing toner remaining on the surface of the photosensitive drum (300) after the transfer operation; and a discharging operation of discharging the surface of the photosensitive drum (300), wherein a pressure roll (720) moves up and down depending on the thickness of the metal (100) in the fixing operation, and wherein the metal (100) is charged by undergoing two or more charging operations of the same polarity such that the toner (T) attached to the photosensitive drum (300) is moved and fixed to the metal (100) during the transfer operation.

11. The metal printing method of claim 10, wherein the fixing operation is performed by heating to 25~400° C.

12. The metal printing method of claim 10, wherein the fixing operation is performed by applying pressure.

13. The metal printing method of claim 10, wherein when printing using two or more toners two or more photosensitive drums are required, and two or more of the charging operations, the exposure operations, the development operations, the transfer operations, and the removal operations are performed using respective photosensitive drums.

* * * * *